United States Patent [19]

Schamberger et al.

[11] 4,198,058
[45] Apr. 15, 1980

[54] PICK-UP WITH EXCHANGEABLE STYLUS

[75] Inventors: Jörg Schamberger; Heinrich Zimmermann, both of St. Georgen, Fed. Rep. of Germany

[73] Assignee: Dual Gebruder Steidinger, St. Georgen, Fed. Rep. of Germany

[21] Appl. No.: 935,535

[22] Filed: Aug. 21, 1978

[51] Int. Cl.² .............................................. G11B 3/02
[52] U.S. Cl. .................... 274/37; 274/24 R
[58] Field of Search .................. 274/37, 38, 36, 24 R; 179/100.41 K

[56] References Cited

U.S. PATENT DOCUMENTS

| | | | |
|---|---|---|---|
| 2,631,858 | 3/1953 | Carlson | 274/37 |
| 3,294,405 | 12/1966 | Pritchard | 274/37 |
| 3,427,032 | 2/1969 | Zimmermann | 274/37 |
| 3,433,487 | 3/1969 | Kawaguchi et al. | 274/37 |
| 3,482,061 | 12/1969 | Grado | 179/100.41 K |
| 3,646,279 | 2/1972 | Stanton | 179/100.41 K |
| 4,075,418 | 2/1978 | Nemoto | 179/100.41 M |

*Primary Examiner*—John W. Shepperd
*Attorney, Agent, or Firm*—Martin A. Farber

[57] ABSTRACT

A pick-up with a carrier element, on which a capsule which contains the electro-mechanical transducer is exchangeably fastened, in which capsule a needle carrier is held pushed-in up to an abutment, and an arm for handling the pick-up is pivotally mounted in the carrier element. A pin is mounted in the capsule substantially transversely to the push-in movement of the needle carrier. One end of the pin can be guided into a recess in the needle carrier and its other end is coupled with the arm such that the pin with said one end is able to be brought in or out of engagement with the recess of the needle carrier by pivoting the arm.

5 Claims, 3 Drawing Figures

PICK-UP WITH EXCHANGEABLE STYLUS

The invention relates to a sound pick-up with a carrier element, on which carrier element a capsule containing the electromagnetic transducer is exchangeably fastened, in which capsule there is held a needle carrier which can be pushed-in up to an abutment stop and in which carrier element there is pivotably mounted an arm for the manipulation of the pick-up.

Since styluses of tone pick-ups only have a limited lifetime and also are easily soiled, today they are mostly fastened on carriers which can be pushed in and removed from the pick-up, respectively, by a layman without tools. The requirements to the operability of such needle carrier mountings are multifaceted. On the one hand the carrier must sit rigidly in the pick-up, so as not to fall out during transportation or other manipulations or handling of the device, for example during cleaning. On the other hand, however, it must be seated only so rigidly that in spite of its relatively small dimensions, it still is able to be easily taken out. Of difficulty, moreover, is that it is located at a location underneath the tone pick-up which is not very accessible, so that, for example, a control of the proper seating is very difficult, although this is very important for an orderly and proper functioning of the pick-up. Accordingly, it is to be considered that reproduction mistakes resulting therefrom are not able to be heard in every case without providing more.

Turntables frequently stand ready for play in business areas. As a result frequently the stylus is stolen because of its easy removability.

A pick-up is known from German patent 12 31 450, in which the carrier element for the capsule with the electromagnetic transducer can be locked by a pivotable tone arm - grabber on a plate-like extension of the tone arm. However such an arrangement is not suited for securing the position of the needle carrier, since the needle carrier lies on the lower side of the capsule and is a substantially smaller part of another type of formation.

It is an object of the present invention to create a needle carrier mounting which corresponds to all these requirements, that is, in addition to its reliable securing in position, particularly by means of a good recognizability of the proper mounting or seating, to increase the assurance that the correct position is occupied, to make theft protection possible, without making replacement of the stylus of the device more difficult for the user.

It is another object of the present invention to provide a pick-up with a carrier element (e.g., 1), on which a capsule (2) which contains the electro-mechanical transducer is exchangeably fastened, in which capsule a needle carrier (5) is held pushable-in up to an abutment (14), and in which carrier element there is swingably mounted an arm (9) for the manipulation of the pick-up, characterized in the manner that in the capsule (2) which contains the transducer, a pin (6) is mounted substantially in a direction transversely to the push-in movement of the needle carrier (5), with one end (12) of the pin being guideable in a recess (13) in the needle carrier (5) and with the other end (11) of the pin being coupled with the arm (9) for manipulation of the pick-up, such that the pin is able to be brought in or out of engagement with the recess (13) of the needle carrier (5) with its end (12) by means of a horizontal pivoting of the arm (9).

It is another object of the invention further in accordance with the above object to provide a pick-up, wherein the pivot movement of the arm (9) for the manipulation of the pick-up is able to be blocked by means of a screw (16) which can be inserted into the carrier element (1) and which engages in a projection (15) of the arm (9).

With the above and other objects and advantages in view, the present invention will become more clearly understood in connection with the following detailed description of a preferred embodiment, when considered with the accompanying drawing, of which:

Figure 1:
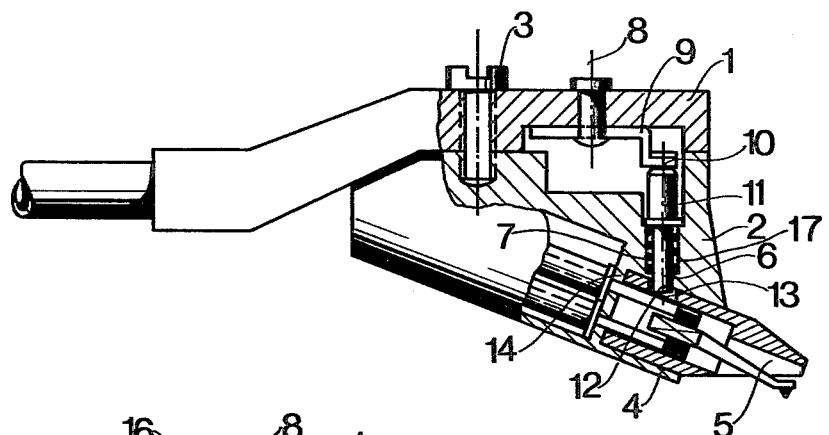
FIG. 1 is a side view of a pick-up taken along the line I—I in FIG. 3.

Referring now to the drawings, by means of the screw 3, a capsule 2 is fastened on the carrier element 1 of a sound pick-up. The capsule 2 contains a known electro-mechanical transducer of the unit. The capsule 2 is formed with an opening 4, in which a needle carrier 5 is able to be pushed-in. In the capsule 2 in a preferably vertical opening 17, moreover, a pin 6 is displaceably mounted against the action and upward biasing of a compression spring 7, the latter also being disposed in a narrowed lower portion of the vertical opening 17 in the capsule 2, the vertical opening 17 being stepped, widening upwardly as well as communicating with the substantially horizontal opening 4. The spring 7 abuts at the top against an annular flange on the pin 6 and on the bottom against a step of the vertical opening 17 of the capsule. The flange has an outer diameter substantially equal to the diameter of an enlarged upper portion of the vertical opening 17 for stable guiding of the pin during its displacement in the vertical opening.

Figure 2:
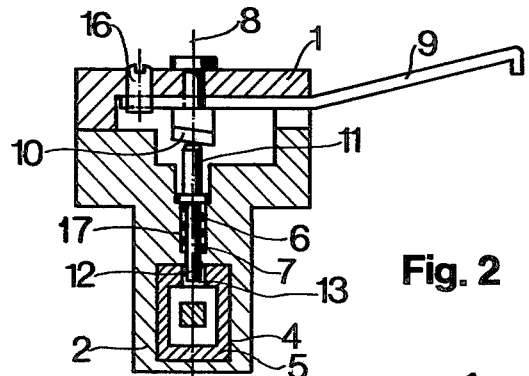
FIG. 2 is a section along the lines II—II in FIG. 3.

An arm 9 is pivotally mounted in the carrier element 1 about an axis 8 by means of a pivot connection and serves for the manipulation and handling of the tone arm or pick-up. The arm 9 is formed with a cam-shaped control surface 10 facing the upper end 11 of the pin 6. The upper end 11 of the pin 6 abuttingly rides against the control surface 10 under the action of the spring 7. The arm pivotally extends beyond the carrier element 1 through a spacing between the carrier element 1 and the capsule 2 as shown in FIG. 2. This spacing is limited by walls which permit only a limited pivotal movement of the arm 9, so that the pin 6 which is spaced slightly in front of the pivot axis 8 of the pick-up handling arm 9, cannot leave the control surface 10 during a pivotal movement of the arm.

The lower end 12 of the pin 6 enters engagingly into a recess 13 formed in the needle carrier 5 and this end 12 consequently holds the latter absolutely securely fixed in its position inside the capsule 2 when the needle carrier is pushed into the opening 4 up to the abutment 14 formed in the capsule, which abutment defines the rear of the opening 4. The control surface 10 constitutes a coupling means between the end 11 of the pin 6 and the tone-arm manipulation arm 9, the control surface being set or adjusted for guiding the end 12 of the pin 6 in and out of the recess 13 in the needle carrier 5 dependent upon the pivotal position of the arm relative to the carrier element 1.

Figure 3:
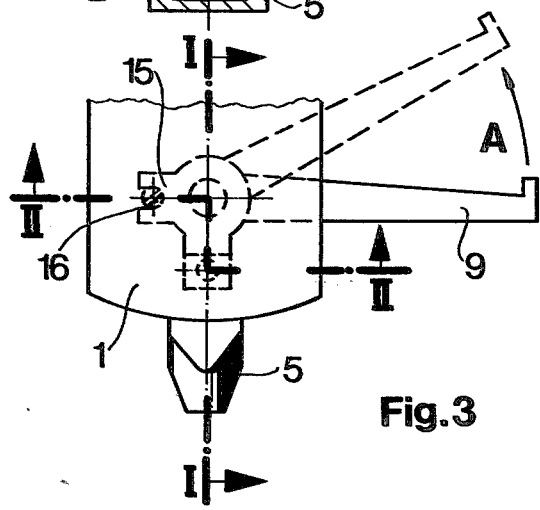
FIG. 3 is a partial plan view of the tone arm in accordance with the present invention.

If the needle carrier 5 is to be removed from the pick-up, the arm 9, which also otherwise serves for handling or manipulation of the pick-up, is pivoted in the direction A (FIG. 3). As a result, under the action of the spring 7 in cooperation with the control surface 10 of the arm 9, the pin 6 slides upwardly in the vertical opening 17, whereby its lower end 12 is lifted out of the recess 13 of the needle carrier 5, so that the latter can be pulled out from the capsule 2. If during reinsertion, a needle carrier 5 is not pushed-in all the way up to its abutment or shoulder 14 in the capsule 2, the arm 9 cannot be pivoted back into its starting or normal operating position, but rather remains in the position illustrated in dashed lines in FIG. 3, since the pin 6 cannot enter the recess 13 of the needle carrier 5 with its lower end then abutting against the outside of the needle carrier 5 and the upper end 11 of the pin 6 being wedged against the control surface 10 of the arm 9, thus preventing the arm 9 from being turned. Consequently an indication which cannot be overlooked is provided that the needle carrier 5 is not in its proper position.

The pivotally mounted arm 9 offers the possibility during shipment of the device from the manufacturer to the dealer, to provide the pick-up with a screw 16, which screw engages in a projection 15 of the arm 9 and consequently locks the arm 9 in its normal operating position. Since a tool is required to release this screw 16, the needle carrier 5 cannot be stolen without anything more being done by a person simply passing by. If the device is sold, the screw 16 generally can be removed.

While we have disclosed one embodiment of the invention, it is understood that this embodiment is given by example only and not in a limiting sense.

We claim:

1. A pick-up, comprising
a carrier element of a pick-up,
arm means for manipulation of the pick-up, said arm means being pivotally mounted in said carrier element,
a capsule containing an electro-mechanical transducer, said capsule being exchangeably fastened on said carrier element, said capsule being formed with a first opening and a second opening,
a needle carrier having a rear end, said needle carrier being held in a pushed in position in said first opening of said capsule,
an abutment means in said capsule for limiting a push-in movement of said needle carrier in said first opening,
a pin displaceably mounted in said second opening of said capsule substantially in a direction transversely to said first opening of said capsule and respectively to the push-in movement of said needle carrier in the capsule,
spring means disposed between said capsule and and said pin for moving said pin in a direction away from said first opening of said capsule,
said needle carrier being formed with recess means arranged for reception of one end of said pin therein when said needle carrier with said rear end abuts said abutment means in said capsule upon being pushed into said first opening of said capsule, thereby said needle carrier being fixed with respect to said capsule in said pushed in position
coupling means disposed between the other end of said pin and said arm means, said coupling means for displacing said pin in an axial direction opposite to said spring means.

2. The pick-up according to claim 1, wherein
said arm means is formed with a projection,
a screw means is releaseably insertable in said carrier element and engages in said projection of said arm means for blocking a pivotal movement of said arm means relative to said carrier element.

3. The pick-up according to claim 1, wherein
said coupling means constitutes a cam control surface formed on said arm means slidably abutting said other end of said pin during pivoting of said arm means.

4. The pick-up according to claim 3, wherein
said second opening in said capsule is substantially transversely arranged relative to and communicating with said first opening,
said pin is formed with an annular flange between said one end and said other end,
said spring means is disposed in said second opening against said annular flange for pressing said other end of said pin against said control surface.

5. The pick-up according to claim 4, wherein
said arm means has an operative pivoted position relative to said carrier element with said cam control surface holding said one end of said pin in said recess means in said needle carrier, said arm means has an inoperative pivoted position relative to said carrier element with said cam control surface in cooperation with said spring means holding said one end of said pin out of said recess means, said arm means being in said inoperative pivoted position when said needle carrier is in said first opening not positioned against said abutment means with said one end of said pin engaging against said needle carrier and said other end against said cam control surface.

* * * * *